US012606327B2

(12) United States Patent (10) Patent No.: US 12,606,327 B2

Takahashi et al. (45) Date of Patent: Apr. 21, 2026

(54) OPERATION SYSTEM OF UNMANNED AIRCRAFT

(71) Applicant: Daifuku Co., Ltd., Osaka (JP)

(72) Inventors: Toyoki Takahashi, Komaki (JP); Keisuke Takeno, Komaki (JP); Satoshi Nitta, Komaki (JP); Hidemoto Fukushima, Komaki (JP)

(73) Assignee: Daifuku Co., Ltd., Osaka (JP)

( * ) Notice: Subject to any disclaimer, the term of this patent is extended or adjusted under 35 U.S.C. 154(b) by 166 days.

(21) Appl. No.: 18/242,630

(22) Filed: Sep. 6, 2023

(65) Prior Publication Data

US 2024/0076067 A1 Mar. 7, 2024

(30) Foreign Application Priority Data

Sep. 7, 2022 (JP) ................................. 2022-142371

(51) Int. Cl.
*B64U 10/60* (2023.01)
*B64U 70/90* (2023.01)
*B64U 101/60* (2023.01)

(52) U.S. Cl.
CPC ............. *B64U 10/60* (2023.01); *B64U 70/90* (2023.01); *B64U 2101/60* (2023.01)

(58) Field of Classification Search
CPC .................................................... B64U 10/60
See application file for complete search history.

(56) References Cited

U.S. PATENT DOCUMENTS

| | | | |
|---|---|---|---|
| 10,364,026 B1 | 7/2019 | Hanlon et al. | |
| 11,983,019 B2 | 5/2024 | Oshima et al. | |
| 12,344,399 B2 | 7/2025 | Oshima et al. | |
| 12,353,221 B2 | 7/2025 | Oshima et al. | |
| 2015/0158587 A1* | 6/2015 | Patrick ..................... | B64D 1/12 |
| | | | 701/3 |
| 2019/0193856 A1* | 6/2019 | Prager ..................... | B64D 1/22 |
| 2021/0023706 A1* | 1/2021 | Sorin ..................... | B25J 15/04 |
| 2021/0129982 A1* | 5/2021 | Collins ................. | B64U 10/60 |
| 2023/0133068 A1* | 5/2023 | Wiegman ............... | B60L 53/62 |
| | | | 320/109 |

FOREIGN PATENT DOCUMENTS

| | | | | |
|---|---|---|---|---|
| EP | 3494043 A1 * | 6/2019 | .......... | B64C 39/024 |
| JP | 201918757 A | 2/2019 | | |
| JP | 6681173 B2 * | 4/2020 | | |
| WO | 2020008582 A1 | 1/2020 | | |
| WO | 2020032262 A1 | 2/2020 | | |
| WO | 2021199243 A1 | 10/2021 | | |

* cited by examiner

*Primary Examiner* — Jean Paul Cass

(74) *Attorney, Agent, or Firm* — The Webb Law Firm

(57) ABSTRACT

An operation system includes: a connecting cable; a winder configured to cause a tensile force to act on the connecting cable; a delivered amount detecting section configured to detect the delivered amount of the connecting cable; a direction detecting section configured to detect a direction of a force acting on a to-be-detected part of the connecting cable; and a position determination section configured to determine a position of an unmanned aircraft. The position determination section determines a distance from a predetermined reference position to the unmanned aircraft based on a detection result from the delivered amount detecting section. The position determination section determines an orientation of the unmanned aircraft on the basis of the to-be-detected part based on a detection result from the direction detecting section.

14 Claims, 4 Drawing Sheets

OPERATION SYSTEM OF UNMANNED AIRCRAFT

CROSS REFERENCE TO RELATED APPLICATION

This application claims priority to Japanese Patent Application No. 2022-142371, filed Sep. 7, 2022 the disclosure of which is hereby incorporated by reference in its entirety.

BACKGROUND OF THE INVENTION

1. Field of the Invention

The present invention relates to an operation system of an unmanned aircraft.

2. Description of Related Art

An operation system of an unmanned aircraft has been known. International Publication No. 2021/199243 (Patent Literature 1) discloses an operation system of an unmanned aircraft in which a base station provides an accurate position of the unmanned aircraft by use of RTK-GNSS positioning. Hereinafter, reference signs described within parentheses in the Description of the Related Art are reference signs used in Patent Literature 1.

In Patent Literature 1, an unmanned aircraft (100) and a base station (404) communicate with a positioning satellite (410) such as a GPS to acquire coordinates of the unmanned aircraft (100) and the base station (404). Because of this, it is difficult to determine the position of the unmanned aircraft in a place where the use of a positioning system using radio waves is difficult, like a place inside a building or the like.

SUMMARY OF THE INVENTION

In view of this, it is desired to attain an operation system of an unmanned aircraft that enables determination of the position of the unmanned aircraft even in a place where it is difficult to use a positioning system using radio waves.

An operation system of an unmanned aircraft according to this disclosure is an operation system of an unmanned aircraft, including: a connecting cable including a connected part connected to the unmanned aircraft; a winder configured to wind a redundant part of the connecting cable to cause a tensile force to act on the connecting cable; a delivered amount detecting section configured to detect a delivered amount of the connecting cable delivered by the winder; a direction detecting section configured to detect a direction of a force acting on a to-be-detected part of the connecting cable between the connected part and the winder; and a position determination section configured to determine a position of the unmanned aircraft. The position determination section determines a distance from a predetermined reference position to the unmanned aircraft based on a detection result from the delivered amount detecting section. The position determination section determines an orientation of the unmanned aircraft on the basis of the to-be-detected part based on a detection result from the direction detecting section.

With this configuration, it is possible to determine the distance to the unmanned aircraft based on the delivered amount of the connecting cable detected by the delivered amount detecting section, and it is possible to determine the orientation of the unmanned aircraft based on the direction of the force acting on the to-be-detected part of the connecting cable detected by the direction detecting section. Accordingly, it is possible to determine the position of the unmanned aircraft based on the distance and the orientation. Hereby, it is possible to determine the position of the unmanned aircraft even in a place where it is difficult to use a positioning system such as a GPS that uses radio waves, because of a shielding that blocks the radio waves, e.g., the inside of a building, a basement, the inside of a tunnel, a shadow of a building, and the like.

Further features and advantages of the technology according to this disclosure will become clearer by the following illustrative and nonlimiting description of embodiments to described with reference to the drawings.

DESCRIPTION OF THE INVENTION

Figure 1:
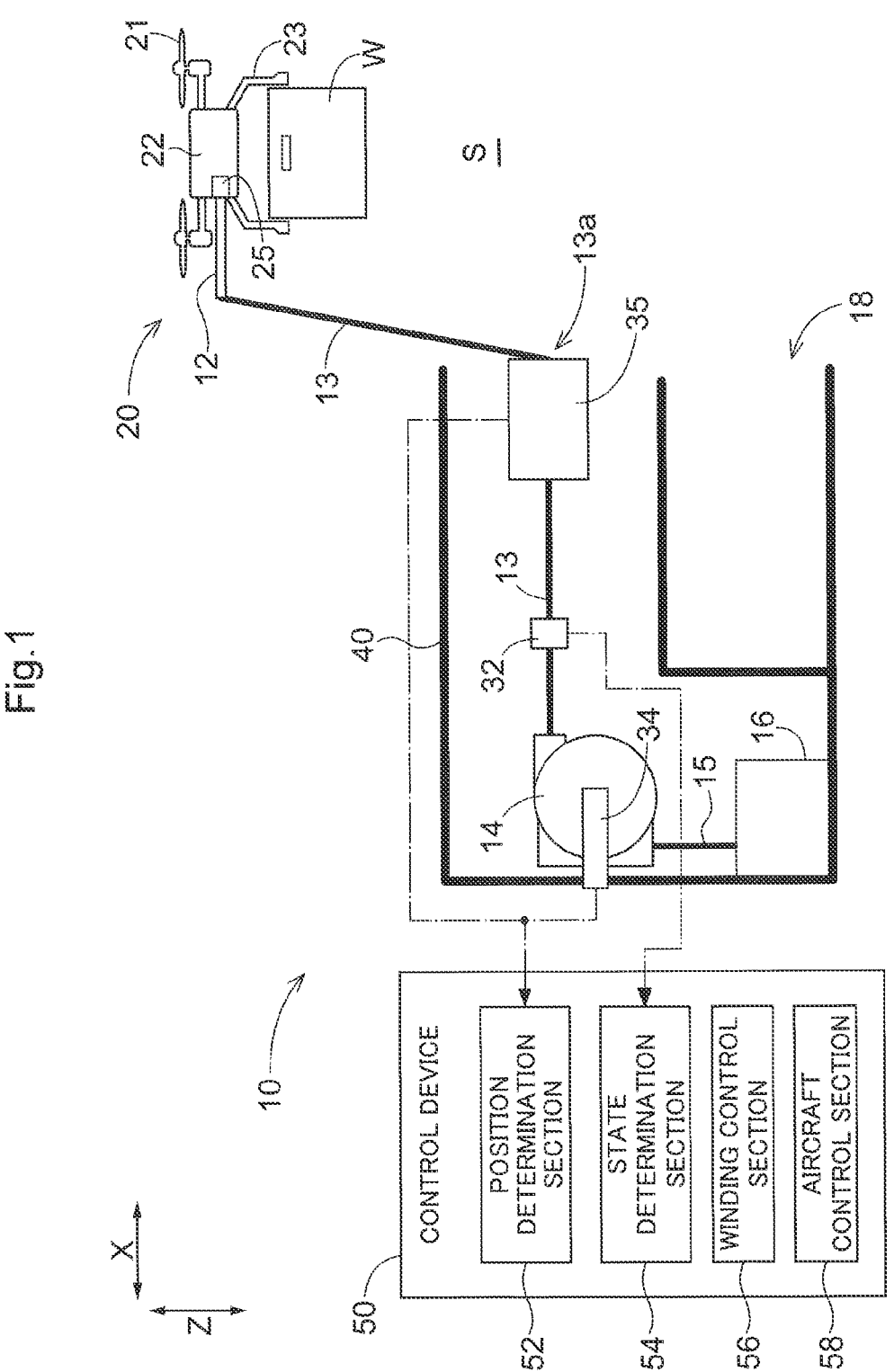
FIG. 1 is a view illustrating an operation system of an unmanned aircraft according to an embodiment of the present invention.
Figure 2:
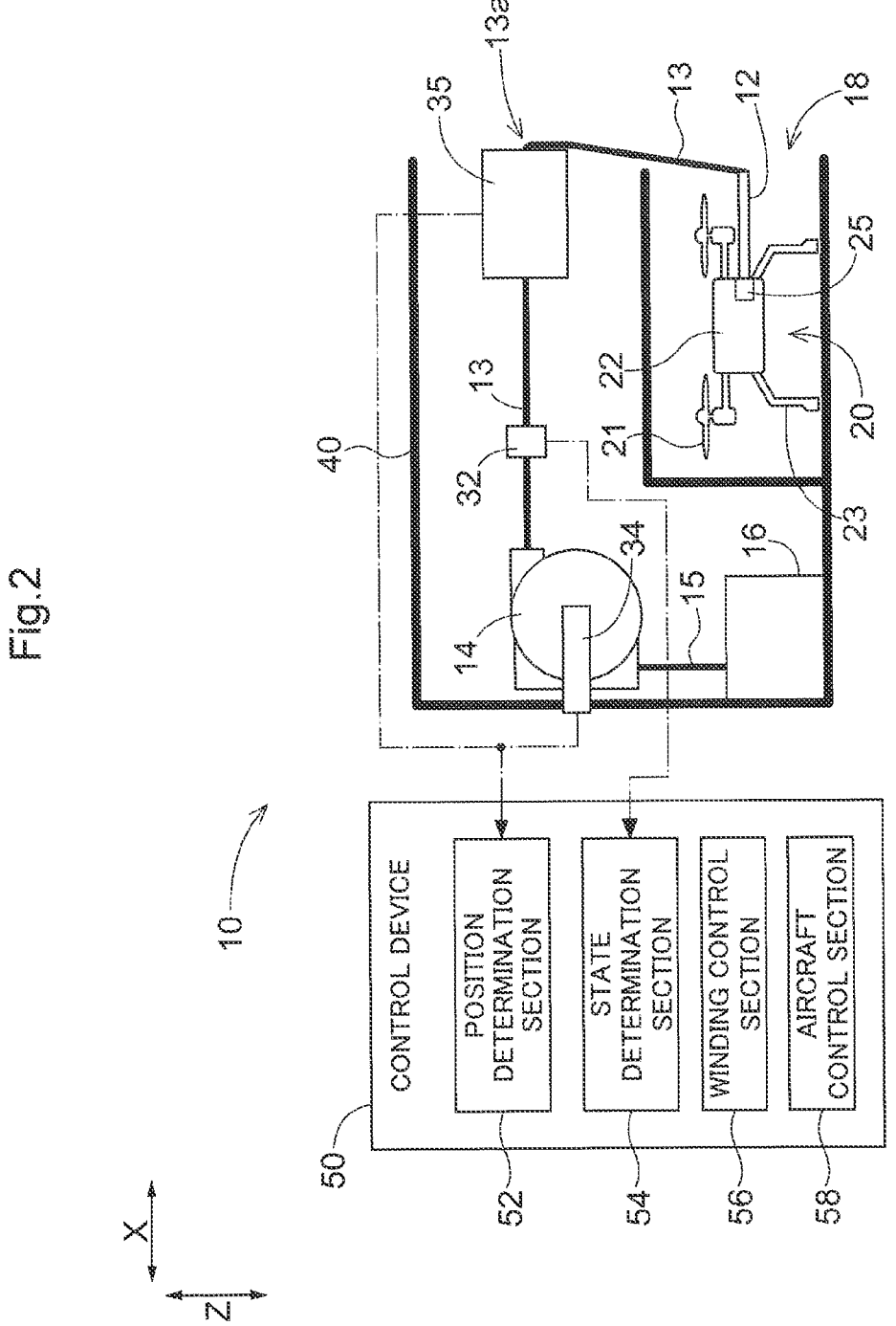
FIG. 2 is a view illustrating a state where the unmanned aircraft lands at a takeoff and landing port in FIG. 1.

The following will describe an operation system 10 of an unmanned aircraft 20 according to an embodiment with reference to the drawings. FIGS. 1 and 2 are side views of a takeoff and landing port 18 in the operation system 10. FIG. 1 illustrates a state where the unmanned aircraft 20 flies, and FIG. 2 illustrates a state where the unmanned aircraft 20 lands at the takeoff and landing port 18. The operation system 10 of the unmanned aircraft 20 is used, for example, for a facility such as a factory, a storeroom, or a vessel, or a transport vehicle where the unmanned aircraft 20 can take off and land. In the present embodiment, the operation system 10 includes the takeoff and landing port 18 where the unmanned aircraft 20 takes off and lands.

The operation system 10 includes a connecting cable 13 including a connected part 12 connected to the unmanned aircraft 20, and a winder 14 configured to wind a redundant part of the connecting cable 13 to cause a tensile force to act on the connecting cable 13. In the example illustrated herein, the operation system 10 includes a case 40 in which the winder 14 is stored. Here, a direction along the vertical direction is referred to as an up-down direction Z, one direction along the horizontal directions is referred to as a first direction X, and a direction perpendicular to the first direction X in a top-bottom view is referred to as a second direction Y. Further, a space where the unmanned aircraft 20 flies is referred to as a flight space S.

As the unmanned aircraft 20, a fixed wing aircraft or a bladed aircraft that is remotely operable or autonomously flyable is used, for example. In the present embodiment, the unmanned aircraft 20 is an electrically driven bladed aircraft that can vertically take off and land. Preferably, the unmanned aircraft 20 is a multicopter (a so-called drone) that is autonomously flyable.

In the present embodiment, the unmanned aircraft 20 includes an article holding section 23 that can hold an article W and release the holding of the article W. Further, the unmanned aircraft 20 includes a main body 22 disposed above the article W held by the article holding section 23. The main body 22 is a part to implement a flight function of the unmanned aircraft 20. The main body 22 includes a mechanism configured to generate thrust and lift. The main body 22 includes an electric machine configured to drive a rotor blade 21 and a rotor blade 21, for example. Further, the article holding section 23 is configured to hold the article W in a state where the article W is hung. In the example illustrated herein, the connected part 12 is provided to at least horizontally project from the main body 22 or the article holding section 23. With this configuration, even in a case where the unmanned aircraft 20 includes the article holding section 23 below the main body 22, and the rotor blades 21 above the main body 22, the connecting cable 13 is restrained from getting entangled in the article holding section 23 or the rotor blades 21 while the tensile force easily acts on the connecting cable 13.

Figure 3:
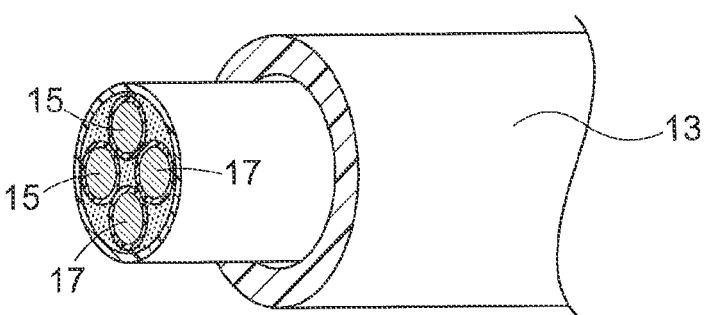
FIG. 3 is a partial sectional view illustrating a connecting cable in FIG. 1 in an enlarged manner.

FIG. 3 is a partial sectional view illustrating the connecting cable 13 in an enlarged manner. As the connecting cable 13, a cable having a metal wire and skin, or the like is used, for example. In the present embodiment, the operation system 10 includes a power line 15 provided integrally with the connecting cable 13. The connecting cable 13 and the power line 15 may be provided in parallel, or further, the connecting cable 13 and the power line 15 may be twisted together. In the example illustrated herein, the power line 15 as a covered conductor and a wiring line 17 for data transmission are provided in the cable as the connecting cable 13. It is desirable that the connecting cable 13 be able to tolerate the maximum weight of the unmanned aircraft 20 and the article W (described later).

In the present embodiment, the operation system 10 includes a power supply 16. The power supply 16 may be stored in the case 40 or may be provided outside the case 40. The power supply 16 is an uninterruptible power supply configured to continue supplying electric power to the unmanned aircraft 20 even in a case where electric power is cut off due to power outage or the like, for example.

In the present embodiment, the unmanned aircraft 20 includes a power receiving section 25. Further, the power supply 16 is connected to the power receiving section 25 of the unmanned aircraft 20 via the power line 15. Hereby, electric power from the power supply 16 is supplied to the unmanned aircraft 20 regularly through the power line 15 provided integrally with the connecting cable 13. Examples of the power receiving section 25 include a power unit configured to stably supply electric power to an electric machine, an electric accumulator, various sensors, and the like carried in the unmanned aircraft 20.

In the present embodiment, the operation system 10 includes a tensile force detecting section 32 configured to detect the magnitude of a tensile force acting on the connecting cable 13. Further, the operation system 10 includes a delivered amount detecting section 34 configured to detect the delivered amount of the connecting cable 13 delivered by the winder 14. Further, the operation system 10 includes a direction detecting section 35 configured to detect a direction of a force acting on a to-be-detected part 13*a* of the connecting cable 13 between the connected part 12 and the winder 14. In the example illustrated herein, the direction detecting section 35 is disposed between the delivered amount detecting section 34 and the connected part 12 (on the flight space S side relative to the delivered amount detecting section 34). The direction detecting section 35 makes contact with the to-be-detected part 13*a* of the connecting cable 13 to detect the direction of the force acting on the to-be-detected part 13*a*. Preferably, the direction detecting section 35 is disposed between the tensile force detecting section 32 and the connected part 12 (on the flight space S side relative to the tensile force detecting section 32).

In the present embodiment, the direction detecting section 35 detects the direction of the force acting on the to-be-detected part 13*a* from pressure, displacement, and the like caused when the direction detecting section 35 makes contact with the to-be-detected part 13*a*. Examples of a sensor to be used in the direction detecting section 35 include force sensors of various types such as a piezoelectric type, an optical type, an electric resistance type, and a capacitance type. Further, for example, force sensors each provided in each of a plurality of tension pulleys (not illustrated) may be configured to function as the tensile force detecting section 32 and the direction detecting section 35. In the example illustrated herein, the tensile force detecting section 32, the delivered amount detecting section 34, and the direction detecting section 35 are stored in the case 40.

In the present embodiment, the takeoff and landing port 18 is disposed to overlap with at least either of the winder 14 and the direction detecting section 35 in a top-bottom view. With this configuration, in comparison with a case where the takeoff and landing port 18 is disposed not to overlap with the winder 14 and the direction detecting section 35 in a top-bottom view, an arrangement place for the operation system 10 is easily restrained to be small. In the example illustrated herein, the takeoff and landing port 18 is disposed to overlap with the direction detecting section 35 in a top-bottom view. Further, the takeoff and landing port 18 is provided integrally with the case 40. In the example illustrated herein, the takeoff and landing port 18 is provided below the direction detecting section 35 and the winder 14 but may be provided above the direction detecting section 35 and the winder 14. In a case where the takeoff and landing port 18 is provided above them, it is possible to easily restrain the connecting cable 13 from getting entangled in the rotor blades 21.

In the present embodiment, the operation system 10 includes a control device 50. In the present embodiment, the control device 50 includes an arithmetic processing unit such as a CPU (Central Processing Unit), and a main storage device such as a RAM (Random Access Memory) or a ROM (Read Only Memory) to which the arithmetic processing unit can refer. Various functions of the control device 50 are implemented in collaboration with hardware included in the control device 50, and programs executed on the hardware such as the arithmetic processing unit or the like. More specifically, when the control device 50 executes a program stored in a storage device (a main storage device, a storage section provided separately, or the like), each function of the control device 50 is implemented. In other words, a program (for example, a transport control program) to cause a computer to implement each function of the control device 50 is stored in a storage device to which the computer can refer. This program is provided by a storage medium or provided through a communication network, for example. The program thus provided is stored in a storage device to which the computer can refer. In the present embodiment, the control device 50 (more specifically, the arithmetic processing unit provided in the control device 50) functions as the "computer." Preferably, the control device 50 is a superior control device provided in a control room (not illustrated), but the control device 50 may be provided in the unmanned aircraft 20. Further, in a case where the control device 50 includes a plurality of pieces of hardware communicably separated from each other, some pieces of hardware may be provided in the unmanned aircraft 20, and remaining pieces of hardware may be provided in the control room (not illustrated).

In the present embodiment, the operation system 10 includes a position determination section 52 configured to determine a position of the unmanned aircraft 20. Further, the operation system 10 includes a state determination section 54 configured to determine a state of the unmanned aircraft 20. Further, the operation system 10 includes a winding control section 56 configured to control the winder 14. Further, the operation system 10 includes an aircraft control section 58 configured to control the unmanned aircraft 20. In the example illustrated in FIG. 1, the control device 50 includes the position determination section 52, the state determination section 54, the winding control section 56, and the aircraft control section 58.

In the present embodiment, the position determination section 52 determines a distance from a predetermined reference position to the unmanned aircraft 20 based on a detection result from the delivered amount detecting section 34. Further, the position determination section 52 determines an orientation of the unmanned aircraft 20 on the basis of the to-be-detected part 13a based on a detection result from the direction detecting section 35. The reference position used by the position determination section 52 may be the position of the to-be-detected part 13a or may be set to the winder 14 or the case 40. Further, the position determination section 52 may determine the distance to the unmanned aircraft 20 and the orientation of the unmanned aircraft 20 by use of the detection result from the delivered amount detecting section 34, the detection result from the direction detecting section 35, and other information. Examples of the other information include coordinate information obtained by processing on an image captured by a GPS (Global Positioning System), an RTK (Realtime Kinematic), or an imaging device, and position information obtained by an optical sensor such as an infrared sensor or an ultrasonic wave sensor.

In the present embodiment, in a case where a tensile force detected by the tensile force detecting section 32 is less than a predetermined flight determination reference value although a take-off command is given to the unmanned aircraft 20 from the aircraft control section 58, the state determination section 54 determines that the unmanned aircraft 20 does not take off. Further, the control device 50 transmits a notification to an administrator when the state determination section 54 determines that the unmanned aircraft 20 does not take off. The aircraft control section 58 may control the unmanned aircraft 20 by use of the wiring line 17 for data transmission, provided in the cable as the connecting cable 13 or may control the unmanned aircraft 20 wirelessly. Further, the unmanned aircraft 20 may be controlled by power line telecommunication (PLC) using the power line 15 to achieve lightweighting of the connecting cable 13 or avoid radio control.

In the present embodiment, in a case where the tensile force detected by the tensile force detecting section 32 is equal to or more than a predetermined crash determination reference value, the state determination section 54 determines that the unmanned aircraft 20 has crashed. Further, the control device 50 transmits a notification to the administrator when the state determination section 54 determines that the unmanned aircraft 20 has crashed.

In the present embodiment, further, in a case where the state determination section 54 determines that the unmanned aircraft 20 has crashed, the winding control section 56 executes a recovery process of winding the connecting cable 13. Further, the control device 50 transmits a notification to the administrator when the winding control section 56 does not complete the recovery process within a predetermined recovery processing time after the winding control section 56 executes the recovery process. Further, the control device 50 transmits a notification to the administrator when the winding control section 56 has completed the recovery process.

Figure 4:
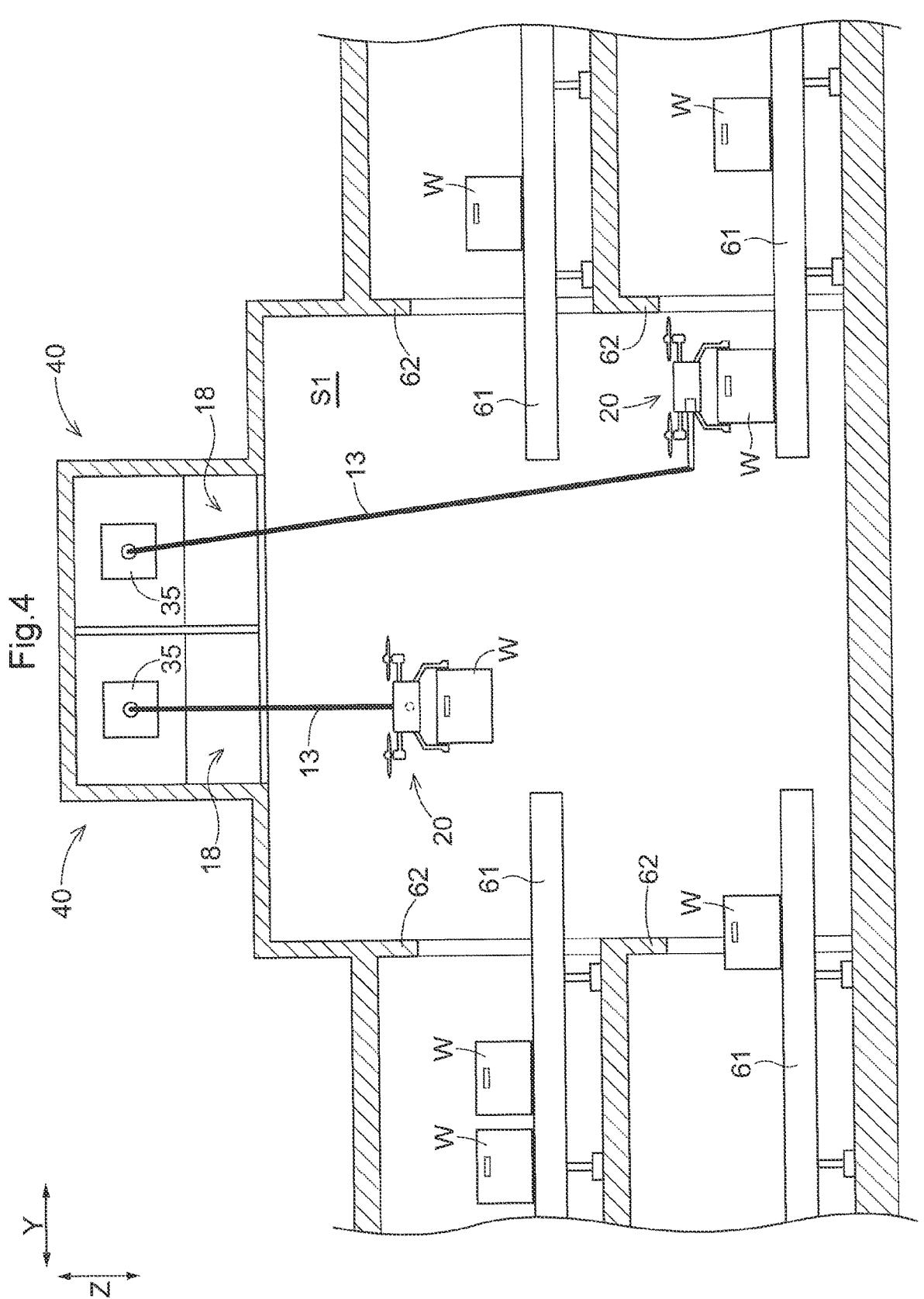
FIG. 4 is a view illustrating a building where the takeoff and landing port in FIG. 1 is disposed.

FIG. 4 is a view illustrating a building where the takeoff and landing port 18 is disposed. In the present embodiment, the unmanned aircraft 20 is configured to fly in a passage space S1 surrounded by a tubular wall 62 extending in the up-down direction Z to transport the article W, and the takeoff and landing port 18 is disposed at a position connected to the passage space S1. Further, the direction detecting section 35 is provided above the center of the passage space S1 in the up-down direction Z. Further, the case 40 in which the winder 14 and the direction detecting section 35 are stored is provided in an uppermost part of the passage space S1. With this configuration, in a case where the unmanned aircraft 20 has crashed, when the winding control section 56 executes the recovery process, a collision of the unmanned aircraft 20 to the ground is easily avoided. It is preferably desirable that the maximum delivered amount of the connecting cable 13 be a value that does not allow the unmanned aircraft 20 and the article W to make contact with a bottom surface disposed in a bottommost part of the passage space S1.

In the present embodiment, a transport device 61 that allows the unmanned aircraft 20 to take off and land and the article W to be delivered and received is provided in the passage space S1. The transport device 61 can transport the article W between the inside and the outside of the passage space S1. Note that the transport device 61 may allow only either of the takeoff and landing of the unmanned aircraft 20 and the delivery and receipt of the article W. If the transport device 61 can deliver and receive the article W, it is desirable that the transport device 61 be provided in each of a plurality of parts in the up-down direction Z along the passage space S1. With this configuration, the article W can be transported in the up-down direction Z by the unmanned aircraft 20 flying stably. This accordingly makes it possible to efficiently transport the article W over a plurality of floors in the building, for example.

Other Embodiments

Next will be described other embodiments of the operation system 10.

(1) The above embodiment has described, as an example, a configuration in which the operation system 10 includes the power line 15 provided integrally with the connecting cable 13. However, the present invention is not limited to such an example. The operation system 10 may include the connecting cable 13 but no power line 15, and the unmanned aircraft 20 may include a storage battery and may be configured to fly by electric power from the storage battery, for example. Further, the takeoff and landing port 18 may include a wireless power supply section. Further, the unmanned aircraft 20 may be configured to be unable to transport the article W.

(2) The above embodiment has described, as an example, a configuration in which the operation system 10 includes the tensile force detecting section 32 and the state determination section 54. However, the present invention is not limited to such an example, and the operation system 10 may include no tensile force detecting section 32 and no state determination section 54. Further, the operation system 10 may include no tensile force detecting section 32 and may be configured such that the state determination section 54 determines whether or not the unmanned aircraft 20 has crashed, based on an image captured by an imaging device.

(3) The above embodiment has described, as an example, a configuration in which the tensile force detecting section 32, the delivered amount detecting section 34, and the direction detecting section 35 are stored in the case 40 in which the winder 14 is stored, and the takeoff and landing port 18 is provided integrally with the case 40. However, the present invention is not limited to such an example, and the tensile force detecting section 32, the delivered amount detecting section 34, the direction detecting section 35, and so on may be disposed outside the case 40. Further, the direction detecting section 35, the case 40, and the takeoff and landing port 18 may be disposed to be separated from each other. Further, the operation system 10 may include no case 40 and no takeoff and landing port 18. Further, the tensile force detecting section 32 may be provided in the unmanned aircraft 20. Further, the direction detecting section 35 may be provided in the unmanned aircraft 20.

(4) The above embodiment has described, as an example, a configuration in which the operation system 10 includes the winding control section 56 configured to control the winder 14. However, the present invention is not limited to such an example. The operation system 10 may include no winding control section 56, and a redundant part of the connecting cable 13 may be wound by an elastic force of an elastic member provided in the winder 14 such that a tensile force acts on the connecting cable 13, for example.

(5) Note that the configuration disclosed in the above embodiment can be applied in combination with the configurations disclosed in other embodiments as long as no inconsistency occurs. In terms of other configurations, the embodiment disclosed in the present specification is also just an example in all respects. Accordingly, various modifications can be made appropriately as far as it does not deviate from the scope of this disclosure.

OVERVIEW OF ABOVE EMBODIMENT

Next will be described the operation system of the unmanned aircraft that has been described above.

An operation system of an unmanned aircraft according to this disclosure is an operation system of an unmanned aircraft, including: a connecting cable including a connected part connected to the unmanned aircraft; a winder configured to wind a redundant part of the connecting cable to cause a tensile force to act on the connecting cable; a delivered amount detecting section configured to detect a delivered amount of the connecting cable delivered by the winder; a direction detecting section configured to detect a direction of a force acting on a to-be-detected part of the connecting cable between the connected part and the winder; and a position determination section configured to determine a position of the unmanned aircraft. The position determination section determines a distance from a predetermined reference position to the unmanned aircraft based on a detection result from the delivered amount detecting section. The position determination section determines an orientation of the unmanned aircraft on the basis of the to-be-detected part based on a detection result from the direction detecting section.

With this configuration, it is possible to determine the distance to the unmanned aircraft based on the delivered amount of the connecting cable detected by the delivered amount detecting section, and it is possible to determine the orientation of the unmanned aircraft based on the direction of the force acting on the to-be-detected part of the connecting cable detected by the direction detecting section. Accordingly, it is possible to determine the position of the unmanned aircraft based on the distance and the orientation. Hereby, it is possible to determine the position of the unmanned aircraft even in a place where it is difficult to use a positioning system such as a GPS that uses radio waves, because of a shielding that blocks the radio waves, e.g., the inside of a building, a basement, the inside of a tunnel, a shadow of a building, and the like.

As one aspect, it is preferable that: the operation system further include a tensile force detecting section configured to detect a magnitude of a tensile force acting on the connecting cable, and a state determination section configured to determine a state of the unmanned aircraft; and in a case where the tensile force detected by the tensile force detecting section is equal to or more than a predetermined crash determination reference value, the state determination section determine that the unmanned aircraft has crashed.

With this configuration, it is possible to determine whether the unmanned aircraft flies normally or has crashed, based on the magnitude of the tensile force acting on the connecting cable.

As one aspect, it is preferable that: the operation system further include a winding control section configured to control the winder; and in a case where the state determination section determines that the unmanned aircraft has crashed, the winding control section execute a recovery process of winding the connecting cable.

With this configuration, even in a case where the unmanned aircraft has crashed, it is possible to easily recover the unmanned aircraft by winding the connecting cable by the winder.

As one aspect, it is preferable that: the operation system further include a tensile force detecting section configured to detect a magnitude of a tensile force acting on the connecting cable, a state determination section configured to determine a state of the unmanned aircraft, and an aircraft control section configured to control the unmanned aircraft; and in a case where the tensile force detected by the tensile force detecting section is less than a predetermined flight determination reference value although a take-off command is given to the unmanned aircraft from the aircraft control section, the state determination section determine that the unmanned aircraft does not take off.

With this configuration, it is possible to determine whether the unmanned aircraft takes off normally or not, based on a command given to the unmanned aircraft from the aircraft control section and the magnitude of the tensile force acting on the connecting cable.

As one aspect, it is preferable that: the operation system further include a power supply, and a power line provided integrally with the connecting cable; and the power supply be connected to a power receiving section of the unmanned aircraft via the power line.

With this configuration, it is possible to supply electric power from the power supply to the unmanned aircraft regularly through the power line provided integrally with the connecting cable.

As one aspect, it is preferable that: the operation system further include a takeoff and landing port where the unmanned aircraft takes off and lands; and the takeoff and landing port be disposed to overlap with at least either of the winder and the direction detecting section in a top-bottom view.

With this configuration, in comparison with a case where the takeoff and landing port is disposed not to overlap with the winder and the direction detecting section in a top-bottom view, it is possible to easily restrain an arrangement place for this operation system to be small.

As one aspect, it is preferable that: the operation system further include a takeoff and landing port where the unmanned aircraft takes off and lands; the unmanned aircraft be configured to fly in a passage space surrounded by a tubular wall extending in an up-down direction to transport an article; and the takeoff and landing port be disposed at a position connected to the passage space.

In a case where the unmanned aircraft flies in the passage space surrounded by the tubular wall to transport an article, it is difficult to operate the unmanned aircraft by determining its position by radio waves because the tubular wall blocks the radio waves. However, with the above configuration, even in the passage space surrounded by the tubular wall, it is possible to operate the unmanned aircraft by determining the position of the unmanned aircraft appropriately.

What is claimed is:

1. An operation system of an unmanned aircraft, comprising:

a connecting cable comprising a connected part connected to the unmanned aircraft;

a winder configured to wind a redundant part of the connecting cable to cause a tensile force to act on the connecting cable;

a delivered amount detecting section configured to detect a delivered amount of the connecting cable delivered by the winder;

a direction detecting sensor configured to detect a direction of a force acting on a to-be-detected part of the connecting cable between the connected part and the winder; and a position determination section configured to determine a position of the unmanned aircraft, wherein:

the position determination section determines a distance from a predetermined reference position to the unmanned aircraft based on a detection result from the delivered amount detecting section;

the position determination section determines an orientation of the unmanned aircraft on the basis of the to-be-detected part based on a detection result from the direction detecting sensor, the position determination section determines the position of the unmanned aircraft based on the distance from the predetermined reference position to the unmanned aircraft and the orientation of the unmanned aircraft on the basis of the to-be-detected part, and the direction detecting sensor detects a direction of a force acting on the to-be-detected part from at least one of pressure and displacement caused in response to the direction detecting sensor coming into contact with the to-be-detected part.

2. The operation system of the unmanned aircraft, according to claim 1, further comprising:

a tensile force detecting section configured to detect a magnitude of a tensile force acting on the connecting cable; and a state determination section configured to determine a state of the unmanned aircraft, wherein:

in a case where the tensile force detected by the tensile force detecting section is equal to or more than a predetermined crash determination reference value, the state determination section determines that the unmanned aircraft has crashed.

3. The operation system of the unmanned aircraft, according to claim 2, further comprising:

a winding control section configured to control the winder, wherein:

in a case where the state determination section determines that the unmanned aircraft has crashed, the winding control section executes a recovery process of winding the connecting cable.

4. The operation system of the unmanned aircraft, according to claim 1, further comprising:

a tensile force detecting section configured to detect a magnitude of a tensile force acting on the connecting cable;

a state determination section configured to determine a state of the unmanned aircraft; and an aircraft control section configured to control the unmanned aircraft, wherein:

in a case where the tensile force detected by the tensile force detecting section is less than a predetermined flight determination reference value although a take-off command to fly while the connecting cable is attached is given to the unmanned aircraft from the aircraft control section, the state determination section determines that the unmanned aircraft does not take off.

5. The operation system of the unmanned aircraft, according to claim 1, further comprising:

a power supply; and a power line provided integrally with the connecting cable, wherein:

the power supply is connected to a power receiving section of the unmanned aircraft via the power line.

6. The operation system of the unmanned aircraft, according to claim 1, further comprising:

a takeoff and landing port where the unmanned aircraft takes off and lands, wherein:

the takeoff and landing port is disposed to overlap with at least either of the winder and the direction detecting sensor in a top-bottom view, the at least either of the winder and the direction detecting sensor being positionally fixed relative to the takeoff and landing port.

7. The operation system of the unmanned aircraft, according to claim 1, further comprising:

a takeoff and landing port where the unmanned aircraft takes off and lands, wherein:

the unmanned aircraft is configured to fly in a passage space surrounded by a tubular wall extending in an up-down direction to transport an article; and the takeoff and landing port is disposed at a position connected to the passage space.

8. The operation system of the unmanned aircraft, according to claim 7, wherein the takeoff and landing port is disposed to overlap with the passage space in a horizontal view.

9. An operation system of an unmanned aircraft, comprising:

a connecting cable comprising a connected part connected to the unmanned aircraft;

a winder configured to wind a redundant part of the connecting cable to cause a tensile force to act on the connecting cable;

a delivered amount detecting section configured to detect a delivered amount of the connecting cable delivered by the winder;

a direction detecting sensor configured to detect a direction of a force acting on a to-be-detected part of the connecting cable between the connected part and the winder;

a position determination section configured to determine a position of the unmanned aircraft;

a takeoff and landing port where the unmanned aircraft takes off and lands, wherein:

the unmanned aircraft is configured to fly in a passage space surrounded by a tubular wall extending in an up-down direction to transport an article; and the takeoff and landing port is disposed at a position connected to the passage space, wherein:

the position determination section determines a distance from a predetermined reference position to the unmanned aircraft based on a detection result from the delivered amount detecting section;

the position determination section determines an orientation of the unmanned aircraft on the basis of the to-be-detected part based on a detection result from the direction detecting sensor, the position determination section determines the position of the unmanned aircraft based on the distance from the predetermined reference position to the unmanned aircraft and the orientation of the unmanned aircraft on the basis of the to-be-detected part, and at least a part of the passage space where the unmanned aircraft is allowed to fly is below at least either of the winder and the direction detecting sensor.

10. An operation system of an unmanned aircraft, comprising:

a connecting cable comprising a connected part connected to the unmanned aircraft;

a winder configured to wind a redundant part of the connecting cable to cause a tensile force to act on the connecting cable;

a delivered amount detecting section configured to detect a delivered amount of the connecting cable delivered by the winder;

a direction detecting sensor configured to detect a direction of a force acting on a to-be-detected part of the connecting cable between the connected part and the winder; and a position determination section configured to determine a position of the unmanned aircraft, and a takeoff and landing port where the unmanned aircraft takes off and lands, wherein:

the position determination section determines a distance from a predetermined reference position to the unmanned aircraft based on a detection result from the delivered amount detecting section;

the position determination section determines an orientation of the unmanned aircraft on the basis of the to-be-detected part based on a detection result from the direction detecting sensor, and the position determination section determines the position of the unmanned aircraft based on the distance from the predetermined reference position to the unmanned aircraft and the orientation of the unmanned aircraft on the basis of the to-be-detected part, and the unmanned aircraft is configured to fly in a space below at least either of the winder and the direction detecting sensor positionally fixed relative to the takeoff and landing port.

11. The operation system of the unmanned aircraft, according to claim 1, wherein the unmanned aircraft is configured to fly with the connecting cable connected thereto.

12. The operation system of the unmanned aircraft, according to claim 1, further comprising:

a takeoff and landing port where the unmanned aircraft takes off and lands, wherein:

the winder is positionally fixed relative to the takeoff and landing port.

13. The operation system of the unmanned aircraft, according to claim 1, wherein the direction detecting sensor detects the direction of a force acting on the to-be-detected part, which direction is orthogonal to a direction of a tensile force at the to-be-detected part.

14. The operation system of the unmanned aircraft, according to claim 1, wherein the direction detecting sensor is on an unmanned aircraft-side relative to the winder.

* * * * *